(12) United States Patent
Villegas

(10) Patent No.: US 8,676,718 B2
(45) Date of Patent: Mar. 18, 2014

(54) EFFICIENTLY DELIVERING AND DISPLAYING A HEATED FOOD PRODUCT

(76) Inventor: Frank Villegas, Fresno, CA (US)

( * ) Notice: Subject to any disclaimer, the term of this patent is extended or adjusted under 35 U.S.C. 154(b) by 12 days.

(21) Appl. No.: 13/276,326

(22) Filed: Oct. 19, 2011

(65) Prior Publication Data

US 2013/0103605 A1 Apr. 25, 2013

(51) Int. Cl.
*G06Q 30/00* (2012.01)

(52) U.S. Cl.
USPC ............................................ 705/332

(58) Field of Classification Search
USPC ............................................ 705/332
See application file for complete search history.

(56) References Cited

U.S. PATENT DOCUMENTS

| | | | | |
|---|---|---|---|---|
| 2,830,909 | A * | 4/1958 | Hagen et al. | 426/315 |
| 4,062,983 | A * | 12/1977 | Roderick | 426/418 |
| 5,939,125 | A * | 8/1999 | Tippmann et al. | 426/523 |
| 6,560,842 | B1 * | 5/2003 | Kusel et al. | 29/455.1 |
| 7,716,083 | B1 * | 5/2010 | Stouvenot | 705/26.5 |
| 2002/0188492 | A1 * | 12/2002 | Borton | 705/8 |
| 2003/0216969 | A1 * | 11/2003 | Bauer et al. | 705/22 |
| 2005/0175441 | A1 * | 8/2005 | Liberman | 414/807 |
| 2005/0175741 | A1 * | 8/2005 | Reinders | 426/106 |
| 2005/0177423 | A1 * | 8/2005 | Swanson, Sr. | 705/14 |
| 2007/0254080 | A1 * | 11/2007 | Schackmuth et al. | 426/523 |
| 2008/0204246 | A1 * | 8/2008 | Kates | 340/572.1 |
| 2008/0215382 | A1 * | 9/2008 | Lutnick et al. | 705/5 |
| 2010/0296545 | A1 * | 11/2010 | Haarer et al. | 374/102 |
| 2011/0273065 | A1 * | 11/2011 | Dickey et al. | 312/138.1 |
| 2012/0043426 | A1 * | 2/2012 | Potter et al. | 244/142 |

OTHER PUBLICATIONS

Walton, Christopher, "Carriers Hope to Wrap Up Parcels Backlog," Commercial Motor, Dec. 16, 2010, p. 6.*
Kellogg, Stuart, "Dinner Is Served: Dial2Dine-in.com Brings Food From High Desert Restaurants to Your Family's Dinner Table," Knight Ridder Tribune Business News, Washington, Feb. 1, 2006, 1.*
Pratt Steven, "Hidden Gems Smaller Firms Thrive With Loyalty, Quality Tortillas Became 'A Miracle' for an Immigrant," Chicago Tribune, North Sports Final C Edition, Chicago, Illinois, May 6, 1993, 1.*
Murray, Gary V., "Couple to Get $2M; Food Poisoning Case Is Resolved," Telegram & Gazette, All Edition, Worcester, Massachusetts, Jun. 3, 1993, p. A1.*
Haines, Tom, "A Sense of Chinatown—History, Family, Food, Tradition Make for a Rich Mix in One of the City's Oldest and Yet Ever-Changing Neighborhoods," Boston Globe, Boston, Massachusetts, Jul. 27, 2008, p. M.7.*

* cited by examiner

*Primary Examiner* — Nathan Erb

(57) ABSTRACT

Aspects for delivering and displaying warm food products are disclosed. In one aspect, a disclosed method includes determining a threshold delivery time for delivering such products after production, and ascertaining a peak period corresponding to a sale of those products at a delivery location. The method further includes loading the warm food products onto a heat-insulated container at a production source, and scheduling a delivery of those products in the heat-insulated container. A heat-insulated display case is also provided, which includes a housing compartment coupled to a display door that includes a window. Here, a seal between the display door and the housing compartment in a closed position is configured to maintain an optimal ambient temperature range within the housing compartment. In a further aspect, another disclosed method includes receiving warm food products from a production source, and loading those products onto a heat-insulated display case.

15 Claims, 10 Drawing Sheets

EFFICIENTLY DELIVERING AND DISPLAYING A HEATED FOOD PRODUCT

TECHNICAL FIELD

The subject disclosure generally relates to the sale and distribution of warm food products, and more specifically to efficiently preserving a heated environment for such food products.

BACKGROUND

By way of background concerning conventional methods for delivering and displaying food products, it is noted that such methods often yield various undesirable characteristics. For instance, although consumers generally prefer purchasing warm food products while they are still warm, such food products often cool down in transit from a production source to a delivery location. To overcome this limitation, some stores attempt to reheat such food products prior to selling them. However, reheating food is often undesirable since consumers generally desire fresh warm food products in which the food's heat is preserved from production.

Accordingly, it would be desirable to provide a methodology for delivering and displaying warm food products which overcomes these limitations. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with delivering and displaying warm food products. In one such aspect, a method to facilitate a delivery of warm food products is provided. The method includes determining a threshold delivery time associated with delivering a warm food product after production, and ascertaining at least one peak period corresponding to a sale of the warm food product at a delivery location. The method further includes loading the warm food product onto a heat-insulated container at a production source proximate to the delivery location, and scheduling a delivery of the warm food product in the heat-insulated container. Within such embodiment, the loading is performed while the warm food product is above a threshold temperature, whereas the delivery is scheduled to arrive at the delivery location from the production source within the threshold delivery time prior to the at least one peak period.

In another aspect, a method to facilitate preserving a heated food environment is provided, which includes receiving a warm food product from a production source, and loading the warm food product onto a heat-insulated display case. For this particular embodiment, the warm food product is received during at least one peak period while the warm food product is above a threshold temperature, and the loading is performed while the warm food product is above the threshold temperature.

In a further aspect, a heat-insulated display case is provided, which includes a housing compartment, and a display door coupled to the housing compartment. Within such embodiment, the display door includes a window, and a seal between the display door and the housing compartment in a closed position is configured to maintain an optimal ambient temperature range within the housing compartment associated with a warm food product.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

As discussed in the background, conventional methods for delivering and displaying warm food products yield various undesirable characteristics. The embodiments disclosed herein are directed towards overcoming such limitations by efficiently preserving a warm food product's heat from production. Namely, methods and apparatuses are disclosed which desirably preserve a warm food product's original heat both while the food product is delivered as well as while it is displayed.

Warm Food Product Production and Delivery Embodiments

Various exemplary non-limiting embodiments are now disclosed for producing and delivering warm food products. To this end, it is noted that the embodiments described herein are not intended to be exhaustive, and that one of ordinary skill will appreciate that various undisclosed embodiments also fall within the scope and spirit of the instant invention.

Figure 1:
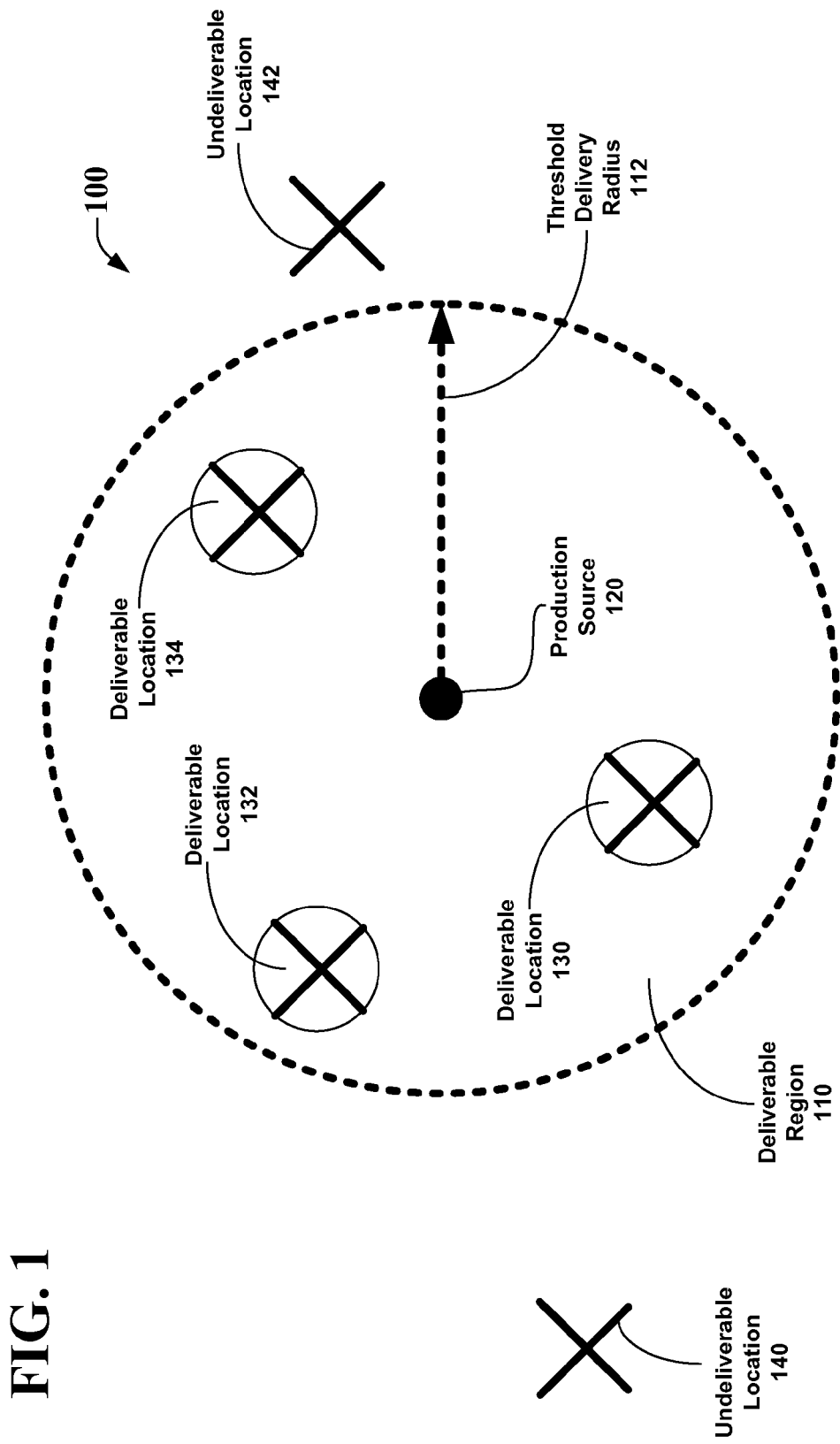
FIG. 1 illustrates an exemplary environment that facilitates delivering warm food products in accordance with an aspect of the subject specification.

Referring first to FIG. 1, an exemplary environment that facilitates delivering warm food products is provided according to an embodiment. In an aspect, environment 100 includes a production source 120, which may deliver warm food products to various locations within a deliverable region 110 having a threshold delivery radius 112, as shown. Moreover, for this particular embodiment, each of deliverable location 130, 132, and 134 are within deliverable region 110, whereas each of undeliverable location 140 and 142 are outside deliverable region 110.

Here, it has been discovered that the scope of deliverable region 110 will vary depending on the particular type of warm food product. Namely, it has been discovered that certain food types have optimal corresponding ambient temperatures, wherein it is desirable to preserve the optimal ambient temperatures for those food types immediately after production. For instance, it has been discovered that the optimal ambient temperature range for tortillas is between ninety and ninety-five degrees Fahrenheit. Accordingly, for tortillas, threshold delivery radius 112 will be the transportation distance for which an optimal ambient temperature range of ninety to ninety-five degrees Fahrenheit can be maintained for such tortillas.

Threshold delivery radius 112 will thus partly depend on the insulation properties of containers used to transport the warm food product. For instance, it has been discovered that conventional ice chests can preserve a temperature range of ninety to ninety-five degrees Fahrenheit for approximately three hours. However, it has been discovered that other containers can also be used which can preserve a temperature range of ninety to ninety-five degrees Fahrenheit for approximately five hours. Accordingly, for tortillas delivered from a production source to a delivery location via conventional ground methods (e.g., via delivery truck), delivery radius 112 may vary between twelve and forty miles.

Figure 2:
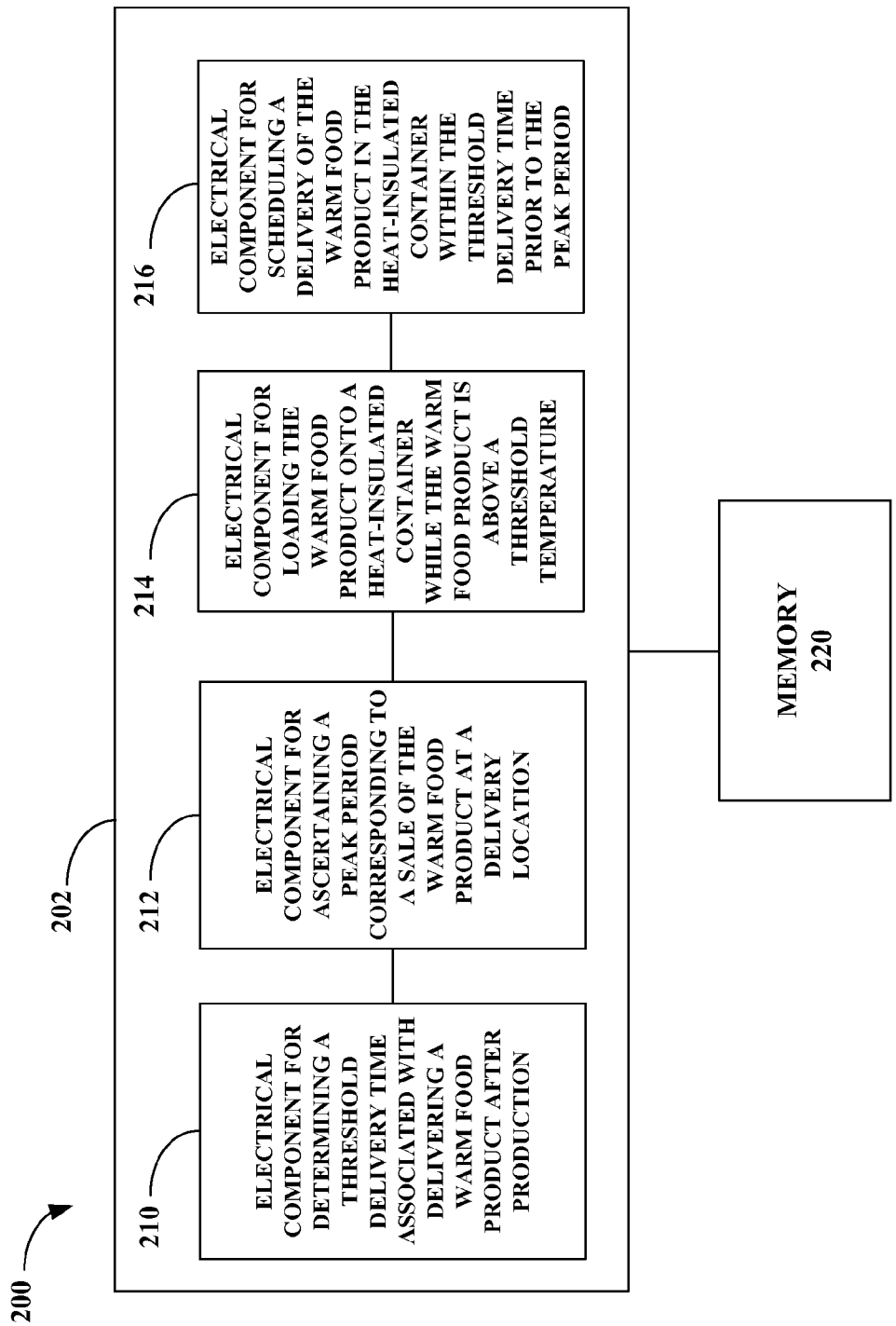
FIG. 2 illustrates an exemplary coupling of electrical components that effectuate delivering warm food products according to an embodiment.

Turning to FIG. 2, illustrated is a system 200 that facilitates delivering warm food products according to an embodiment. System 200 and/or instructions for implementing system 200 can reside within a computing device, for example. As depicted, system 200 includes functional blocks that can represent functions implemented by a processor using instructions and/or data from a computer readable storage medium. System 200 includes a logical grouping 202 of electrical components that can act in conjunction. As illustrated, logical grouping 202 can include an electrical component for determining a threshold delivery time associated with delivering a warm food product after production 210, as well as an electrical component for ascertaining a peak period corresponding to a sale of the warm food product at a delivery location 212. Logical grouping 202 can also include an electrical component for loading the warm food product onto a heat-insulated container while the warm food product is above a threshold temperature 214. Furthermore, logical grouping 202 can include an electrical component for scheduling a delivery of the warm food product in the heat-insulated container within the threshold delivery time prior to the peak period 216. Additionally, system 200 can include a memory 220 that retains instructions for executing functions associated with electrical components 210, 212, 214, and 216. While shown as being external to memory 220, it is to be understood that electrical components 210, 212, 214, and 216 can exist within memory 220.

Figure 3:
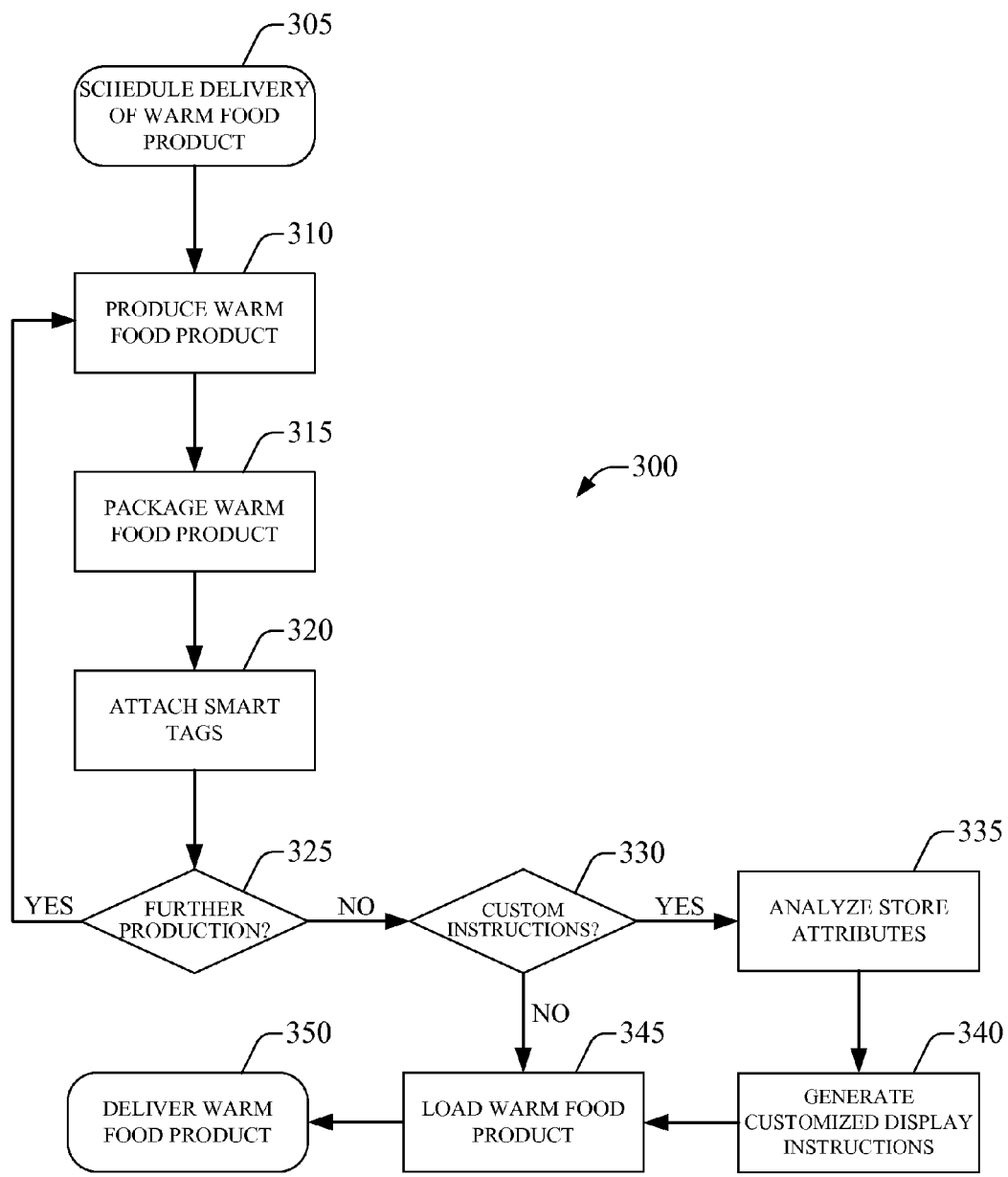
FIG. 3 illustrates a flow diagram of an exemplary methodology to facilitate a delivery of warm food products in accordance with an aspect of the subject specification.

Referring next to FIG. 3, a flow chart illustrating an exemplary method to facilitate a delivery of warm food products is provided. It should be appreciated that process 300 includes a series of acts that may be performed within a computing device according to an aspect of the subject specification. For instance, process 300 may be implemented by employing a processor to execute computer executable instructions stored on a computer readable storage medium to implement the series of acts. In another embodiment, a computer-readable storage medium comprising code for causing at least one computer to implement the acts of process 300 are contemplated.

In an aspect, process 300 begins with the scheduling of a warm food product delivery at act 305. Here, it should be appreciated that such scheduling may depend on various factors. For instance, it may be desirable to schedule deliveries so that the warm food product arrives shortly before a store's peak sales period. Scheduling may also take into account logistical issues such as the types of vehicles and containers used to transport the warm food product, since threshold delivery times for preserving optimal ambient temperatures will vary accordingly. Once a delivery has been scheduled, process 300 continues to act 310 where the warm food product is produced followed by a packaging of the warm food product at act 315.

For some embodiments, it is contemplated that smart tags can be utilized to monitor various aspects of the warm food product, wherein such smart tags are attached to a packaging of the warm food product at act 320. As used herein, smart tags are defined to be electronic tags configured to have communication capabilities with external entities. For instance, a smart tag may be configured as a transponder under a conventional print-coded label, which may include a computer chip, antenna, and bonding wires as an inlay. Within such embodiment, labels may be prepared as a paper roll with the inlays laminated between the rolled carrier and the label media for use in specially designed printer units.

In a particular aspect, it should be noted that smart tags as described herein may be configured utilizing radio frequency identification (RFID) technology. One of ordinary skill in the art will appreciate that RFID technology uses radio waves to transfer data from an electronic tag, called an RFID tag or label, attached to an object, through a reader for the purpose of identifying and tracking the object. To this end, one of ordinary skill in the art will further appreciate that RFID tags are configured to store information electronically, wherein such tags generally include a small radio frequency (RF) transmitter and receiver. An RFID reader is then used to interrogate the tag by transmitting an encoded radio signal, which the tag receives and responds with its identification information. Here, it should be noted that, rather than using a battery, many RFID tags use the radio energy transmitted by the reader as its energy source. Furthermore, some RFID systems include a method of discriminating between several tags that might be within the range of an RFID reader.

Any or all of the RFID technology aspects described above, in addition to RFID technology aspects generally known in the art, may be implemented in conjunction with the aspects disclosed herein for delivering and displaying warm food products. For instance, a smart tag attached at act 320 may be configured as an RFID tag to facilitate storing information associated with the warm food product. Such information may, for example, include at least one of a dynamic temperature indication or a dynamic freshness indication, since the warm food product's temperature/freshness may vary in time. In a particular embodiment, the information associated with the warm food product is a binary representation of whether the warm food product exceeds at least one of a threshold temperature or a threshold freshness. Namely, rather than transmitting detailed temperature/freshness information, it may be desirable to provide a binary representation indicating whether the warm food product's current temperature/freshness exceeds a threshold (i.e., fresh/not fresh, warm/not warm, etc.).

Once a smart tag has been attached, process 300 then proceeds to act 325 where a further production determination is determined. If more units of the warm food product are desired, process 300 loops back to act 310 where additional warm food product units are produced. Otherwise, if more units are not desired, process 300 proceeds to act 330.

At act 330, process 300 determines whether customized instructions for displaying the warm food product are desired. Such instructions may, for example, include instructions associated with displaying the warm food product in a heat-insulated display case, which may be location-specific. Accordingly, if customized instructions are indeed desired, process 300 may proceed to act 335 where store attributes for the delivery location are analyzed. For instance, act 335 may include analyzing commerce traffic patterns at the delivery location, wherein customized display instructions are subsequently generated at act 340 which include a positioning of the heat-insulated display case in the delivery location based on the commerce traffic patterns (e.g., positioning the heat-insulated display case in "high" traffic areas).

Any of various other types of display instructions are also contemplated. For example, act 335 may include distinguishing between a heated shelf life and a non-heated shelf life, wherein the instructions generated at act 340 include a transfer protocol associated with transferring the warm food product from within the heat-insulated display case to outside the heat-insulated display case. Such protocol may, for instance, identify various triggers for moving the warm food product from within the heat-insulated display case to a shelf outside the heat-insulated display case (e.g., receiving a new shipment of the warm food product, ambient temperature within display case falling below a threshold, etc.).

Once instructions are generated at act 340, process 300 proceeds to act 345 where the warm food product is loaded onto a heat-insulated transportation container. Otherwise, if instructions were not desired, process 300 may proceed directly to act 345 from act 330. Process 300 then concludes at act 350 where the warm food product is delivered to the desired delivery location within the heat-insulated container.

Warm Food Product Display Embodiments

Various exemplary non-limiting embodiments are now disclosed for displaying warm food products. To this end, it is noted that the embodiments described herein are not intended to be exhaustive, and that one of ordinary skill will appreciate that various undisclosed embodiments also fall within the scope and spirit of the instant invention.

Figure 4:
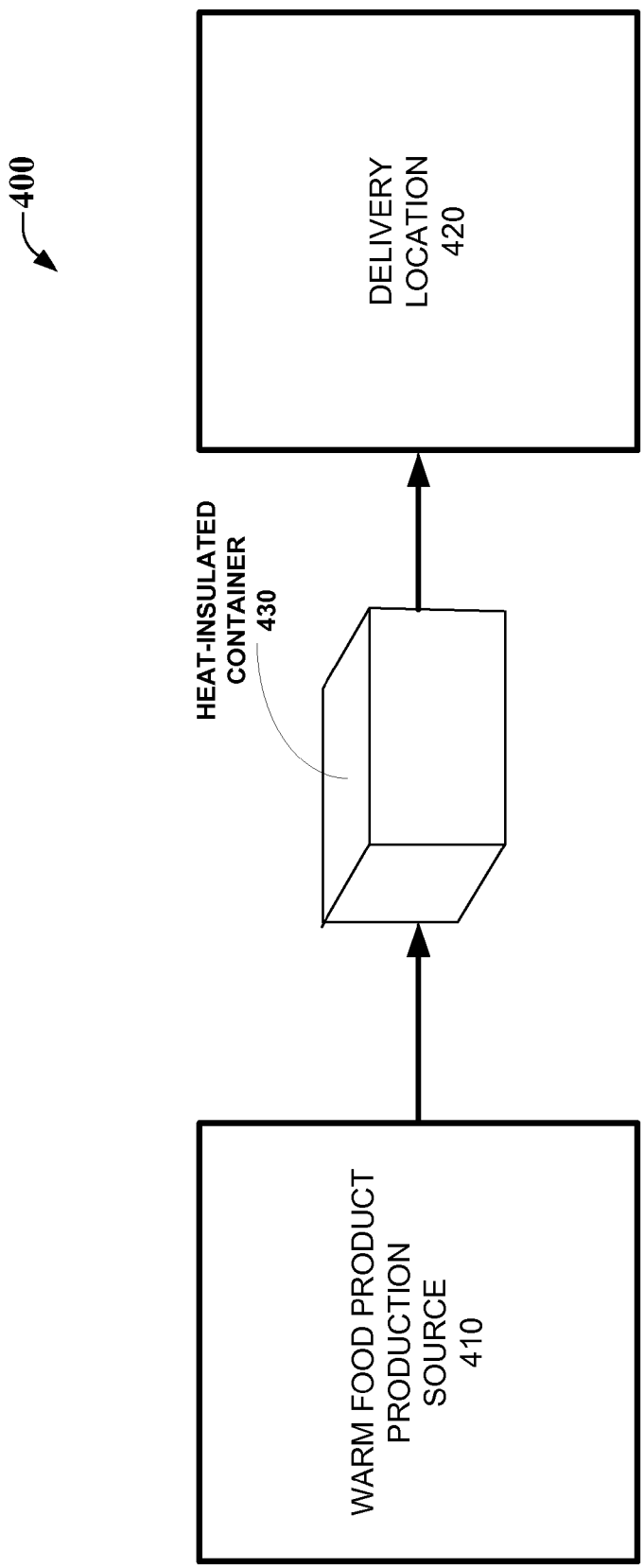
FIG. 4 illustrates an exemplary environment that facilitates displaying warm food products in accordance with an aspect of the subject specification.

Referring next to FIG. 4, an exemplary environment that facilitates displaying warm food products is provided according to an embodiment. In an aspect, environment 400 includes a warm food product production source 410 and a delivery location 420, as shown. Within such embodiment, it is contemplated that delivery location 420 (e.g., a supermarket) will coordinate with warm food product production source 410 (e.g., a warm food product production plant) to receive a warm food product via heat-insulated container 430. Moreover, it is contemplated that delivery location 420 will coordinate with warm food product production source 410 to strategically receive warm food products just prior to peak sale hours. Warm food product production source 410 will then schedule production of the warm food product according to the desired delivery time, wherein deliveries are provided via heat-insulated container 430. Once received, the warm food product is removed from heat-insulated container 430 and immediately loaded onto a heat-insulated display case, wherein the loading is performed while the warm food product is above a threshold temperature associated with the warm food product.

Figure 5:
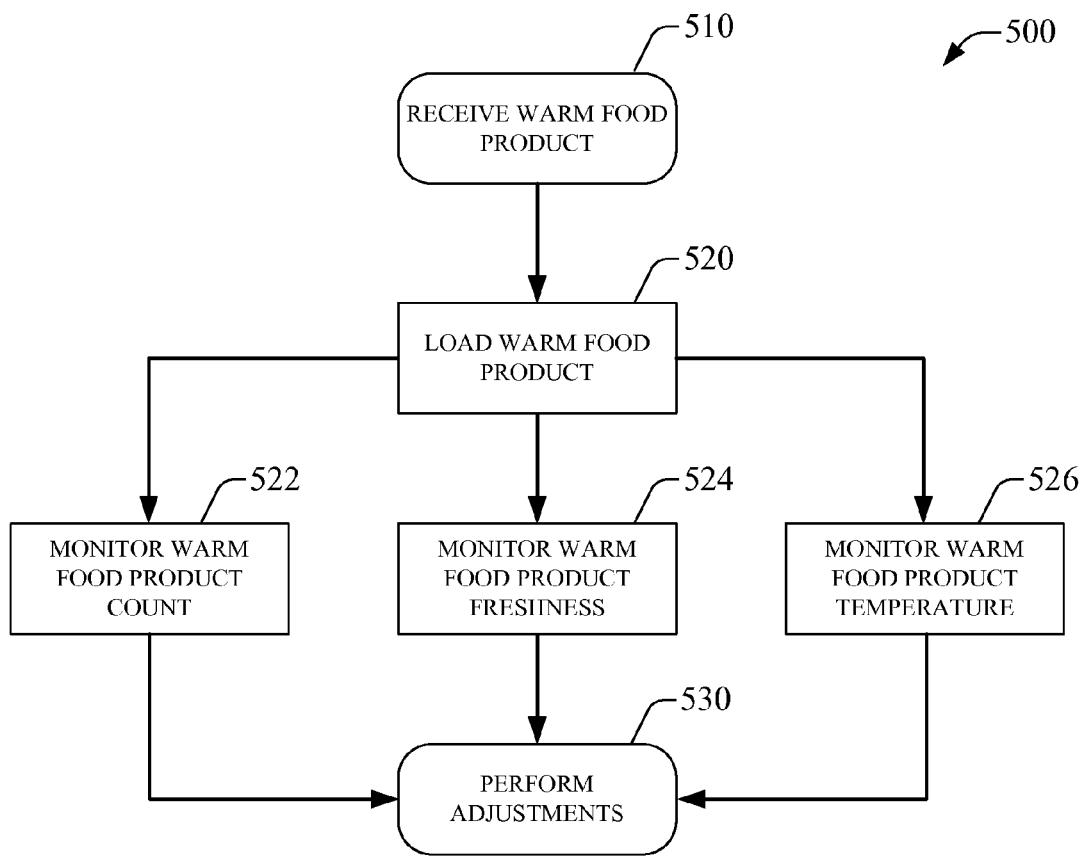
FIG. 5 illustrates a flow diagram of an exemplary methodology that facilitates preserving a heated food environment in accordance with an aspect of the subject specification.

A flow chart illustrating an exemplary method to facilitate preserving a heated food environment is provided next in FIG. 5. Here, similar to process 300, it should be appreciated that process 500 includes a series of acts that may be performed within a computing device according to an aspect of the subject specification. For instance, process 500 may be implemented by employing a processor to execute computer executable instructions stored on a computer readable storage medium to implement the series of acts. In another embodiment, a computer-readable storage medium comprising code for causing at least one computer to implement the acts of process 500 are contemplated.

In an aspect, process 500 begins with a delivery location receiving a warm food product at act 510. As mentioned previously, such deliveries are desirably received via heat-insulated containers (e.g., an ice chest), wherein an optimal ambient temperature for the warm food product is preserved in transit. Once received, the warm food product is then immediately loaded onto a heat-insulated display case at act 520, wherein an original warmth from production is maintained above a threshold temperature associated with the warm food product (e.g., between ninety to ninety-five degrees Fahrenheit for tortillas).

It is contemplated that it may be desirable to monitor various aspects of the warm food product subsequent to them being loaded for display. For instance, at act 522 a warm food product count can be monitored. To facilitate such monitoring, a smart tag reader (e.g., an RFID reader) may be configured to monitor smart tags attached to a packaging of warm food products within the heat-insulated display case. By monitoring a warm food product count in such a manner, sale-related metrics may be more easily collected (e.g., peak sale hours, peak sale ambient temperature, peak sale freshness, etc.). Indeed, process 500 may further utilize smart tag readers to facilitate monitoring a warm food product's freshness at act 524, as well to facilitate monitoring a warm food product's temperature at act 526, as shown. Process 500 may then conclude at act 530 where appropriate adjustments are performed based on the monitoring of the warm food product. For instance, based on the monitoring, a warm product producer may be notified to adjust future production/deliveries according to metrics collected at either of act 522, 524, and/or 526.

Heat-Insulated Display Case Embodiments

Various exemplary non-limiting embodiments are now disclosed for a heat-insulated display case. To this end, it is noted that the embodiments described herein are not intended to be exhaustive, and that one of ordinary skill will appreciate that various undisclosed embodiments also fall within the scope and spirit of the instant invention.

Figure 6:
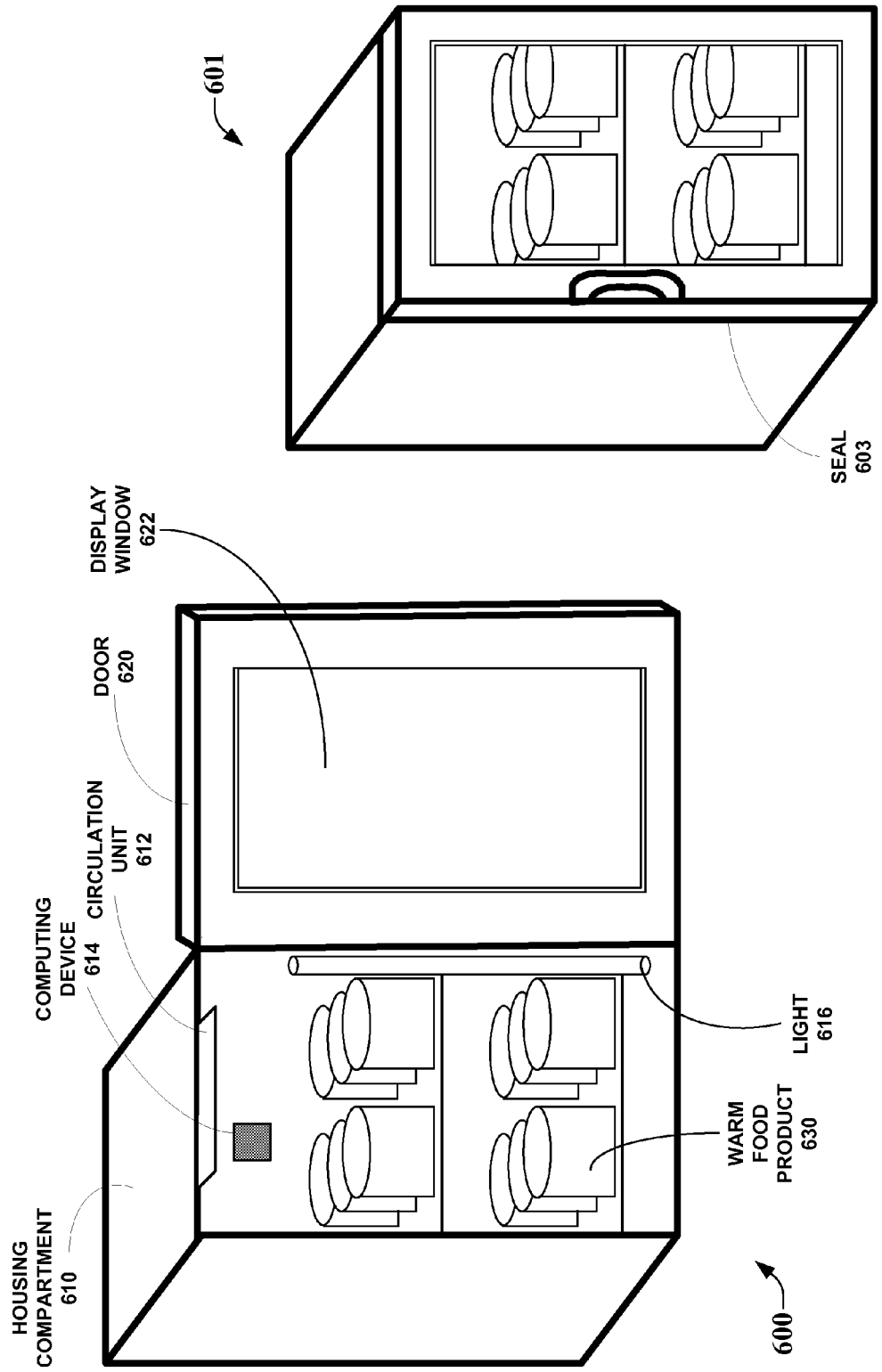
FIG. 6 illustrates an exemplary heat-insulated display case in accordance with a first embodiment.

Referring next to FIG. 6, an exemplary heat-insulated display case in accordance with a first embodiment is provided. For this particular embodiment, a vertical design is shown, wherein the heat-insulated display case is shown in both an open position 600 and a closed position 601. As illustrated, it is contemplated that a heat-insulated display case may include a housing compartment 610 coupled to a door 620, which includes a transparent display window 622. In a closed position 601, it is further contemplated that door 620 will form a seal 603 with housing compartment 610 to facilitate preserving an optimal ambient temperature within housing compartment 610 for warm food product 630.

To this end, it should be appreciated that some embodiments may desirably include heat-insulated display cases in which no power is required. For environmental purposes, such designs may be particularly desirable. In fact, it is contemplated that discarded refrigerators may be transformed into the heat-insulated display cases described herein, which would desirably provide a mechanism for recycling such refrigerators. Within such embodiment, a conventional refrigerator door may be replaced with door 620 for display purposes, which includes transparent display window 622. Furthermore, since a heat-insulated display case would desirably not require use of a compressor, such compressors may be removed from conventional refrigerators for resale.

In other embodiments, however, it may be desirable to implement designs requiring at least a nominal amount of power. For instance, as illustrated, some embodiments may include light 616, which may be configured to illuminate and/or heat housing compartment 610. A heating system may also be included to ensure that the ambient temperature within housing compartment 610 remains within an optimal temperature range for warm food product 630. To further facilitate maintaining an optimal ambient temperature, circulation unit 612 may also be included, wherein circulation unit 612 is configured to circulate warm air within housing compartment 610.

In another aspect, it is contemplated that a computing device 614 may also be included. Here, it should be appreciated that computing device 614 may be configured to perform any of a plurality of tasks associated with displaying warm food product 630. For instance, computing device 614 may be a smart tag reader configured to read a smart tag attached to warm food product 630. Computing device 614 may also, for example, be configured to monitor the ambient temperature within housing compartment 610 and automatically adjust the ambient temperature if it falls below a threshold temperature.

Figure 7:
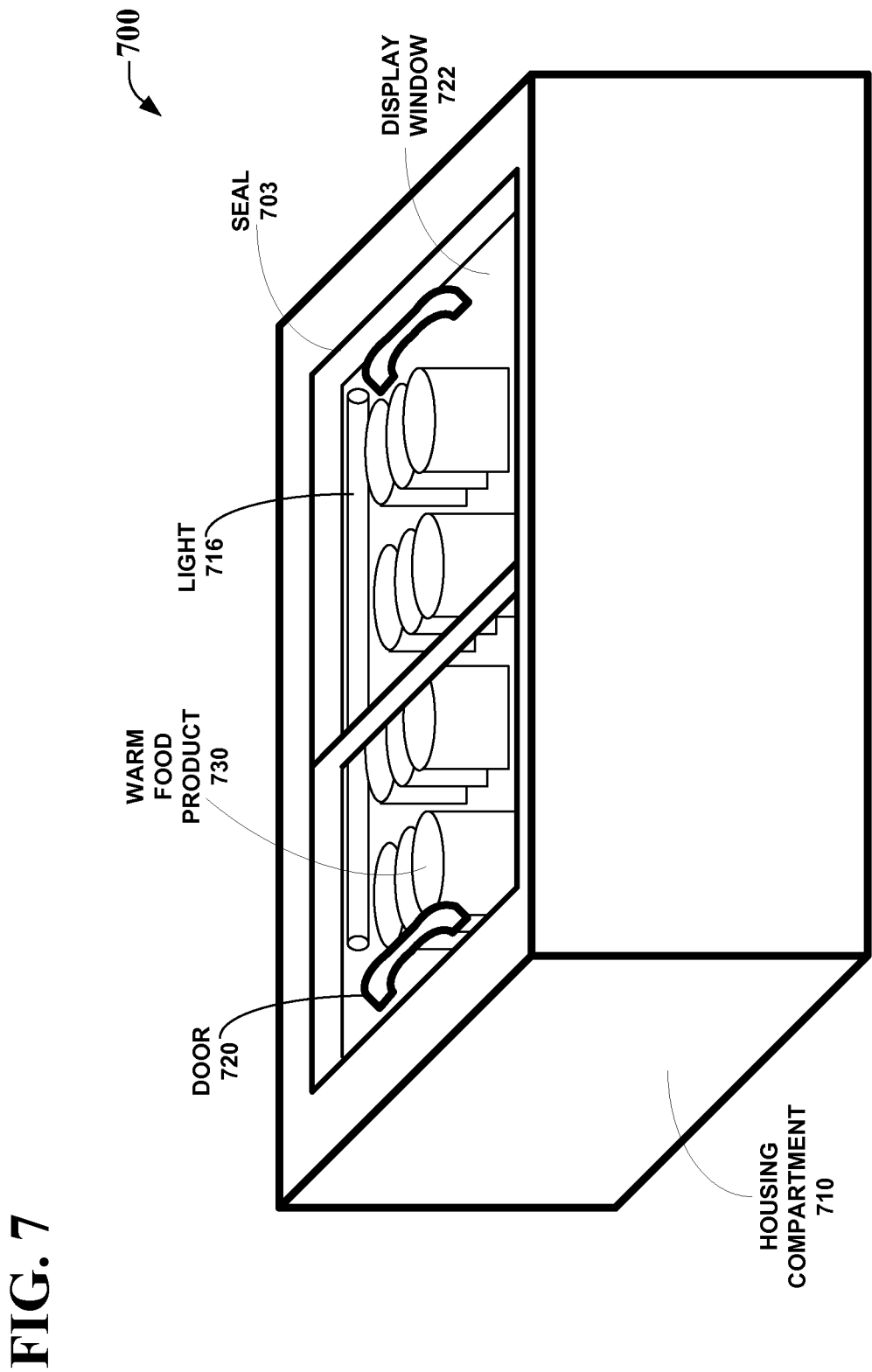
FIG. 7 illustrates an exemplary heat-insulated display case in accordance with a second embodiment.

Referring next to FIG. 7, an exemplary heat-insulated display case in accordance with a second embodiment is provided. For this particular embodiment, a horizontal design is shown, wherein such horizontal design is substantially similar to the vertical design illustrated in FIG. 6 and thus may incorporate at least the same aspects described for the vertical design. For this particular embodiment, heat-insulated display case 700 includes sliding door 720 which forms a seal 703 with housing compartment 710 when in a closed position. As illustrated, sliding door 720 includes display window 722 which is transparent to facilitate displaying warm food product 730 within housing compartment 710. Heat-insulated display case 700 may also include light 716, wherein light 716 may be configured to illuminate and/or heat housing compartment 710

Figure 8:
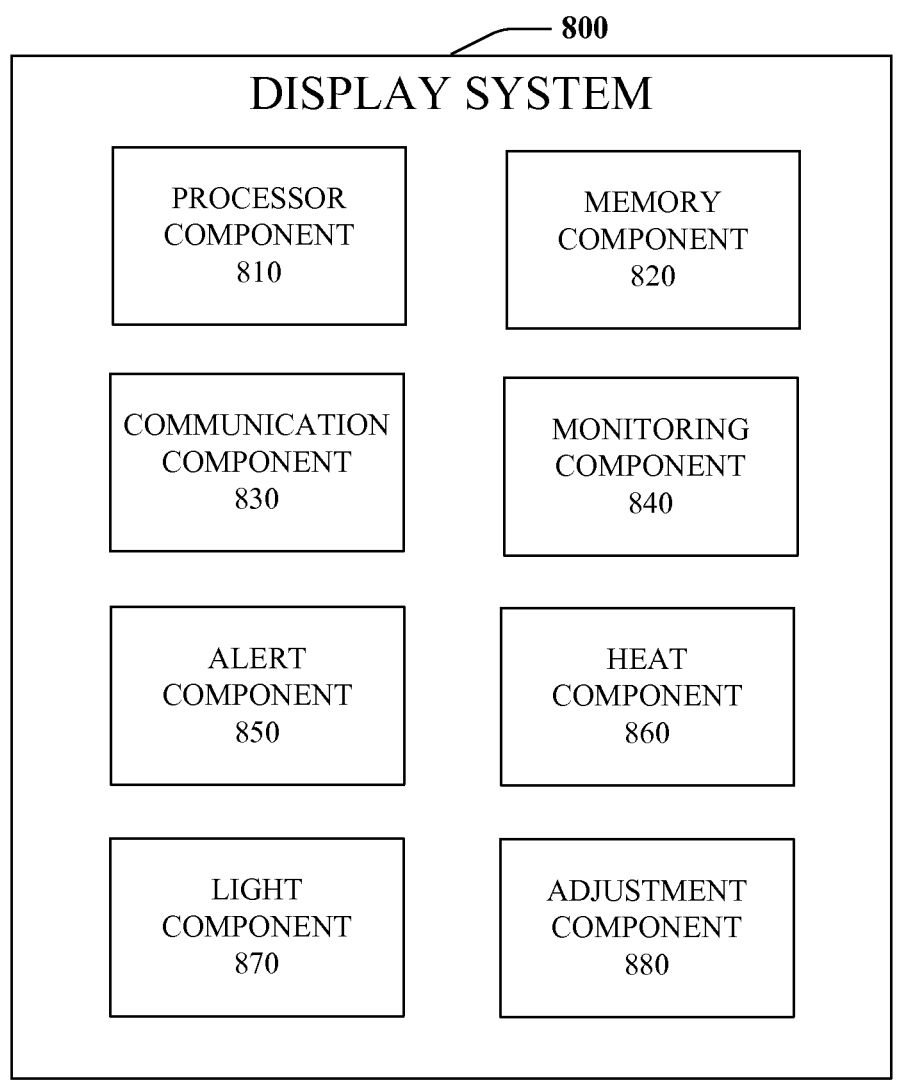
FIG. 8 illustrates a block diagram of an exemplary display system that facilitates preserving a heated food environment in accordance with an aspect of the subject specification.

Referring next to FIG. 8, a block diagram of an exemplary display system that facilitates preserving a heated food environment according to an embodiment is illustrated. As shown, display system 800 may include processor component 810, memory component 820, communication component 830, monitoring component 840, alert component 850, heat component 860, light component 870, and adjustment component 880. Here, it should be appreciated that aspects of display system 800 may be included as part of the heat-insulated display cases described herein. For instance, with respect to heat-insulated display case 600, computing device 614 may be configured to perform various aspects of display system 800.

In one aspect, processor component 810 is configured to execute computer-readable instructions related to performing any of a plurality of functions. Processor component 810 can be a single processor or a plurality of processors which analyze and/or generate information utilized by memory component 820, communication component 830, monitoring component 840, alert component 850, heat component 860, light component 870, and/or adjustment component 880. Additionally or alternatively, processor component 810 may be configured to control one or more components of display system 800.

In another aspect, memory component 820 is coupled to processor component 810 and configured to store computer-readable instructions executed by processor component 810. Memory component 820 may also be configured to store any of a plurality of other types of data including data generated by any of communication component 830, monitoring component 840, alert component 850, heat component 860, light component 870, and/or adjustment component 880. Memory component 820 can be configured in a number of different configurations, including as random access memory, battery-backed memory, hard disk, magnetic tape, etc. Various features can also be implemented upon memory component 820, such as compression and automatic back up (e.g., use of a Redundant Array of Independent Drives configuration).

In yet another aspect, display system 800 includes communication component 830, which is coupled to processor component 810 and configured to interface display system 800 with external entities. Within such embodiment, communication component 830 may be configured to receive commands from an external entity to perform any of a plurality of tasks. For instance, communication component 830 may be configured to receive a "power down" command from a store manager several miles away from the heat-insulated display case. Communication component 830 may also be configured to transmit data to external entities. For example, communication component 830 may be configured to notify a store manager (e.g., via e-mail, MMS, SMS, etc.) when the temperature within the display case falls below a threshold temperature.

As illustrated, display system 800 may also include monitoring component 840 and alert component 850. Within such embodiment, monitoring component 840 may be configured to monitor at least one aspect associated with the warm food product, whereas alert component 850 may be configured to provide an indication (e.g., a sound, a wireless communication, non-wireless communication, etc.) of the at least one aspect associated with the warm food product. To this end, it should be appreciated that monitoring component 840 may be configured to monitor warm food product aspects of various types. For instance, monitoring component 840 may be a smart tag reader configured to read a smart tag. Monitoring component 840 may also be configured to monitor a housing temperature within a housing compartment, wherein a climate regulating device is configured to automatically regulate the housing temperature to within an optimal ambient temperature range for the warm food product.

In another aspect, display system 800 includes heat component 860 and light component 870. For this embodiment, heat component 860 is configured to facilitate maintaining an optimal ambient temperature range within a display case's housing compartment, whereas light component 870 is configured to illuminate the housing compartment (i.e., via a fluorescent light source, LED light source, etc.). In a particular embodiment, however, light component 870 is configured to function as both a heat source and a light source. For instance, light component 870 may be a heat lamp configured to emanate an appropriate amount of heat to maintain an optimal ambient temperature for the warm food product within the housing compartment. Within such embodiment, the heat lamp may further include a protective sleeve to protect customers from inadvertently burning themselves.

Display system 800 may also include adjustment component 880, as shown. For these embodiments, adjustment component 880 is configured to adjust various aspects of the heat-insulated display case according to data ascertained by monitoring component 840. For instance, adjustment component 880 may be coupled to the aforementioned climate regulating device to automatically adjust the housing temperature to within an optimal ambient temperature range for the warm food product.

Exemplary Networked and Distributed Environments

One of ordinary skill in the art can appreciate that various embodiments for implementing the use of a computing device and related embodiments described herein can be implemented in connection with any computer or other client or server device, which can be deployed as part of a computer network or in a distributed computing environment, and can be connected to any kind of data store. Moreover, one of ordinary skill in the art will appreciate that such embodiments can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 9:
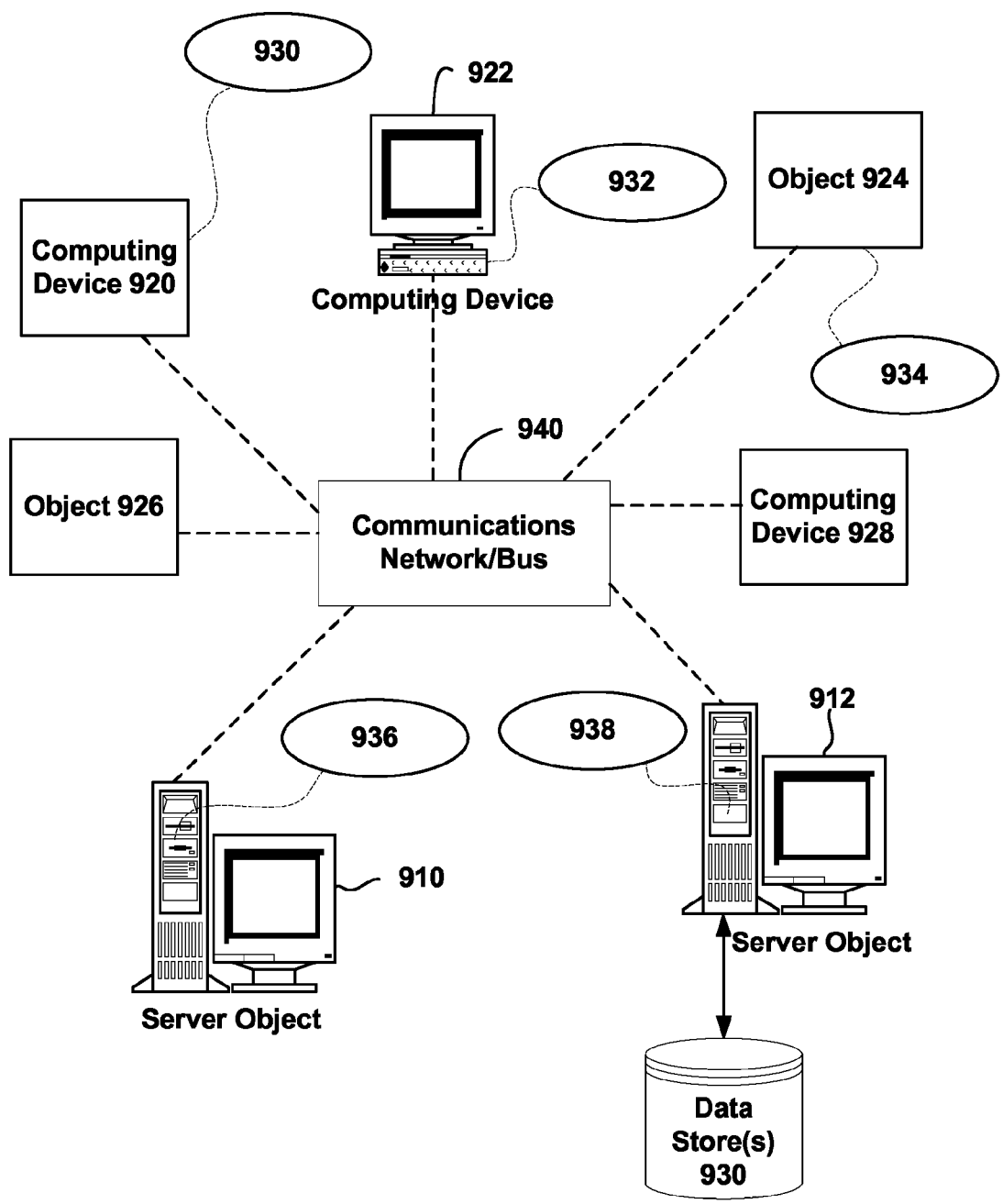
FIG. 9 is a block diagram representing exemplary non-limiting networked environments in which various embodiments described herein can be implemented.

FIG. 9 provides a non-limiting schematic diagram of an exemplary networked or distributed computing environment. The distributed computing environment comprises computing objects or devices 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects or devices 910, 912, etc. and computing objects or devices 920, 922, 924, 926, 928, etc. may comprise different devices, such as PDAs (personal digital assistants), audio/video devices, mobile phones, MP3 players, laptops, etc.

Each computing object or device 910, 912, etc. and computing objects or devices 920, 922, 924, 926, 928, etc. can communicate with one or more other computing objects or devices 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object or device 910, 912, etc. or 920, 922, 924, 926, 928, etc. can also contain an application, such as applications 930, 932, 934, 936, 938, that might make use of an API (application programming interface), or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects or devices 910, 912, etc. can be thought of as servers where computing objects or devices 910, 912, etc. provide data services, such as receiving data from computing objects or devices 920, 922, 924, 926, 928, etc., storing of data, processing of data, transmitting data to computing objects or devices 920, 922, 924, 926, 928, etc., although any computer can be considered a client, a server, or both, depending on the circumstances. Any of these computing devices may be processing data, or requesting services or tasks that may implicate an infrastructure for information as a service from any platform and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 940 is the Internet, for example, the computing objects or devices 910, 912, etc. can be Web servers with which the computing objects or devices 920, 922, 924, 926, 928, etc. communicate via any of a number of known protocols, such as HTTP. As mentioned, computing objects or devices 910, 912, etc. may also serve as computing objects or devices 920, 922, 924, 926, 928, etc., or vice versa, as may be characteristic of a distributed computing environment.

Exemplary Computing Device

As mentioned, several of the aforementioned embodiments apply to any device wherein it may be desirable to include a computing device to facilitate delivering and/or displaying warm food products according to the aspects disclosed herein. It is understood, therefore, that handheld, portable and other computing devices and computing objects of all kinds are contemplated for use in connection with the various embodiments described herein, i.e., anywhere that a device may provide some functionality in connection with delivering and/or displaying warm food products. Accordingly, the below general purpose remote computer described below in FIG. 10 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer executable instructions, such as program modules, being executed by one or more computers, such as client workstations, servers or other devices. Those skilled in the art will appreciate that network interactions may be practiced with a variety of computer system configurations and protocols.

Figure 10:
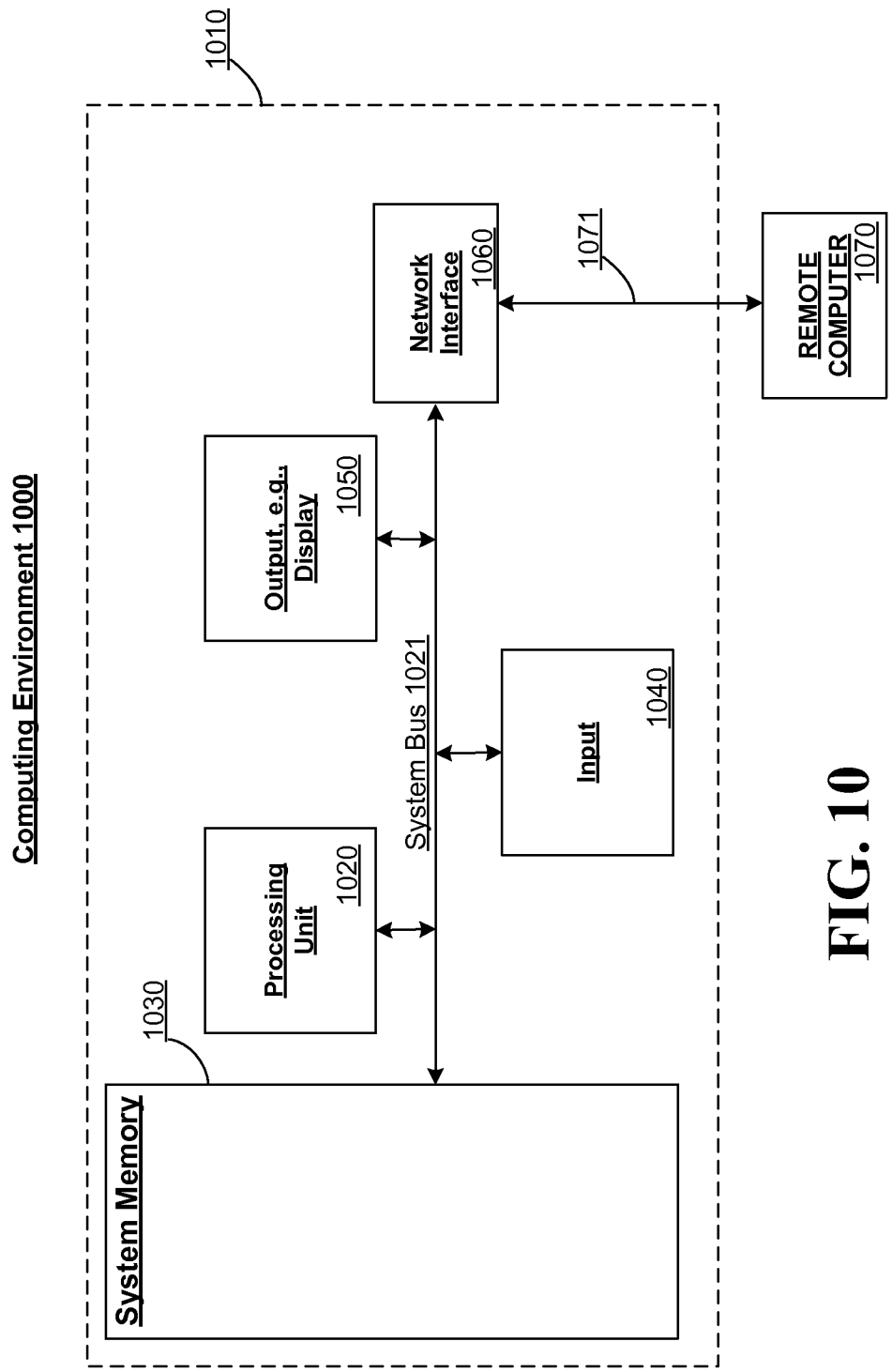
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or more of the embodiments may be implemented, although as made clear above, the computing system environment 1000 is only one example of a suitable computing environment and is not intended to suggest any limitation as to the scope of use or functionality of any of the embodiments. The computing environment 1000 is not to be interpreted as having any dependency or requirement relating to any one or combination of components illustrated in the exemplary operating environment 1000.

With reference to FIG. 10, an exemplary remote device for implementing one or more embodiments herein can include a general purpose computing device in the form of a handheld computer 1010. Components of handheld computer 1010 may include, but are not limited to, a processing unit 1020, a system memory 1030, and a system bus 1021 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user may enter commands and information into the computer 1010 through input devices 1040 A monitor or other type of display device is also connected to the system bus 1021 via an interface, such as output interface 1050. In addition to a monitor, computers may also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1071, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to publish, build applications for or consume data in connection with interactions with a cloud or network service.

There are multiple ways of implementing one or more of the embodiments described herein, e.g., an appropriate API, tool kit, driver code, operating system, control, standalone or downloadable software object, etc. which enables applications and services to use the infrastructure for information as a service from any platform. Embodiments may be contemplated from the standpoint of an API (or other software object), as well as from a software or hardware object that facilitates provision of an infrastructure for information as a service from any platform in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed is:

1. A method to facilitate a delivering warm food products, comprising:
    receiving data identifying a delivery location;
    determining a threshold delivery time associated with delivering a warm food product after production;
    ascertaining at least one peak period corresponding to a sale of the warm food product at the delivery location;
    loading the warm food product onto a heat-insulated container at a production source proximate to the delivery location, wherein the loading is performed while the warm food product is above a threshold temperature;
    calculating, by a computer system, a threshold delivery radius from the production source, the calculating based on a corresponding type of the warm food product and a corresponding type of the heat-insulated container;
    scheduling a delivery of the warm food product in the heat-insulated container within the threshold delivery radius from the production source, wherein the delivery is scheduled to arrive at the delivery location from the production source within the threshold delivery time prior to the at least one peak period; and
    generating, by the computer system, customized location-specific instructions associated with displaying the warm food product in a heat-insulated display case, based at least in part on the identified delivery location.

2. The method according to claim 1, further comprising producing the warm food product via multiple production cycles corresponding to a plurality of peak periods associated with a single day, wherein the at least one peak period is the plurality of peak periods.

3. The method according to claim 1, wherein the threshold delivery time is three hours, and wherein the threshold temperature is ninety degrees Fahrenheit.

4. The method according to claim 1, further comprising analyzing commerce traffic patterns at the delivery location, wherein the instructions include a positioning of the heat-insulated display case in the delivery location based on the commerce traffic patterns.

5. The method according to claim 1, further comprising distinguishing between a heated shelf life and a non-heated shelf life, wherein the instructions include a transfer protocol associated with transferring the warm food product from within the heat-insulated display case to outside the heat-insulated display case.

6. The method according to claim 1, further comprising attaching a smart tag to a packaging of the warm food product, wherein the smart tag is configured to store information associated with the warm food product.

7. The method according to claim 6, wherein the information associated with the warm food product is at least one of a dynamic temperature indication or a dynamic freshness indication.

8. The method according to claim 7, wherein the information associated with the warm food product is a binary representation of whether the warm food product exceeds at least one of a threshold temperature or a threshold freshness.

9. The method according to claim 1, further comprising preserving an original heat of the warm food product during the delivery, wherein the preserving comprises maintaining an optimal ambient temperature specific to the warm food product within the heat-insulated container during the delivery.

10. A non-transitory computer-readable storage medium storing code for causing at least one computer to implement various acts, the acts comprising:
    receiving data identifying a delivery location;
    determining a threshold delivery time associated with delivering a warm food product after production within a heat-insulated container;
    ascertaining at least one peak period corresponding to a sale of the warm food product at the delivery location;
    calculating a threshold delivery radius from a production source proximate to the delivery location, the calculating based on a corresponding type of the warm food product and a corresponding type of the heat-insulated container, wherein a loading of the warm food product onto the heat-insulated container is performed at the production source while the warm food product is above a threshold temperature;
    scheduling a delivery of the warm food product in the heat-insulated container within the threshold delivery radius from the production source, wherein the delivery is scheduled to arrive at the delivery location from the production source within the threshold delivery time prior to the at least one peak period; and
    generating customized location-specific instructions associated with displaying the warm food product in a heat-insulated display case, based at least in part on the identified delivery location.

11. A system comprising:
    a processor; and
    a memory, communicatively coupled to the processor;
    wherein the system is configured to perform a method comprising:
        receiving data identifying a delivery location;
        determining a threshold delivery time associated with delivering a warm food product after production;
        ascertaining at least one peak period corresponding to a sale of the warm food product at the delivery location;
        calculating a threshold delivery radius from a production source proximate to the delivery location, the calculating based on a corresponding type of the warm food product and a corresponding type of heat-insulated container used to transport the warm food product, wherein a loading of the warm food product onto the heat-insulated container is performed at the production source while the warm food product is above a threshold temperature;
        scheduling a delivery of the warm food product in the heat-insulated container within the threshold delivery radius from the production source, wherein the delivery is scheduled to arrive at the delivery location from the production source within the threshold delivery time prior to the at least one peak period; and generating customized location-specific instructions associated with displaying the warm food product in a heat-insulated display case, based at least in part on the identified delivery location.

12. The system according to claim 11, the method further comprising monitoring at least one aspect of the warm food product, wherein the at least one aspect includes information ascertained from a smart tag attached to a packaging of the warm food product.

13. The system according to claim 12, wherein the monitoring comprises ascertaining a count of the warm food product within the heat-insulated display case.

14. The system according to claim 12, wherein the monitoring comprises ascertaining at least one of a dynamic temperature indication or a dynamic freshness indication.

15. The system according to claim 11, the method further comprising:

monitoring an ambient temperature inside the heat-insulated display case; and maintaining the ambient temperature within an optimal temperature window associated with the warm food product.

* * * * *